United States Patent

[11] 3,532,113

[72] Inventor Robert J. McKean
 300 Hayward Ave., Mount Vernon, New York 10552
[21] Appl. No. 719,132
[22] Filed April 5, 1968
[45] Patented Oct. 6, 1970

[54] CUTOFF VALVE
 6 Claims, 5 Drawing Figs.
[52] U.S. Cl. ................................................ 137/318, 29/213
[51] Int. Cl. .............................................. F16k 3/02
[50] Field of Search ................................... 137/317, 318; 251/193, 360, 362; 29/213

[56] References Cited
UNITED STATES PATENTS
| | | | |
|---|---|---|---|
| 1,898,935 | 2/1933 | Brandriff | 137/318X |
| 2,899,983 | 8/1959 | Farris | 137/318X |
| 2,984,129 | 5/1961 | Allen | 29/213X |
| 3,394,727 | 7/1968 | Wagner | 137/318 |

Primary Examiner—William F. O'Dea
Assistant Examiner—David R. Matthews
Attorney—Eugene E. Geoffrey, Jr.

ABSTRACT: A cutoff valve for interrupting the flow of fluid through a pipe without interrupting the pressure source which includes means for engaging the pipe and having a rotary cutting element operable to cut through the pipe to terminate the flow of fluid with the cutting element forming the valving means and which element can be withdrawn to reestablish fluid flow.

Patented Oct. 6, 1970
3,532,113
Sheet 1 of 2
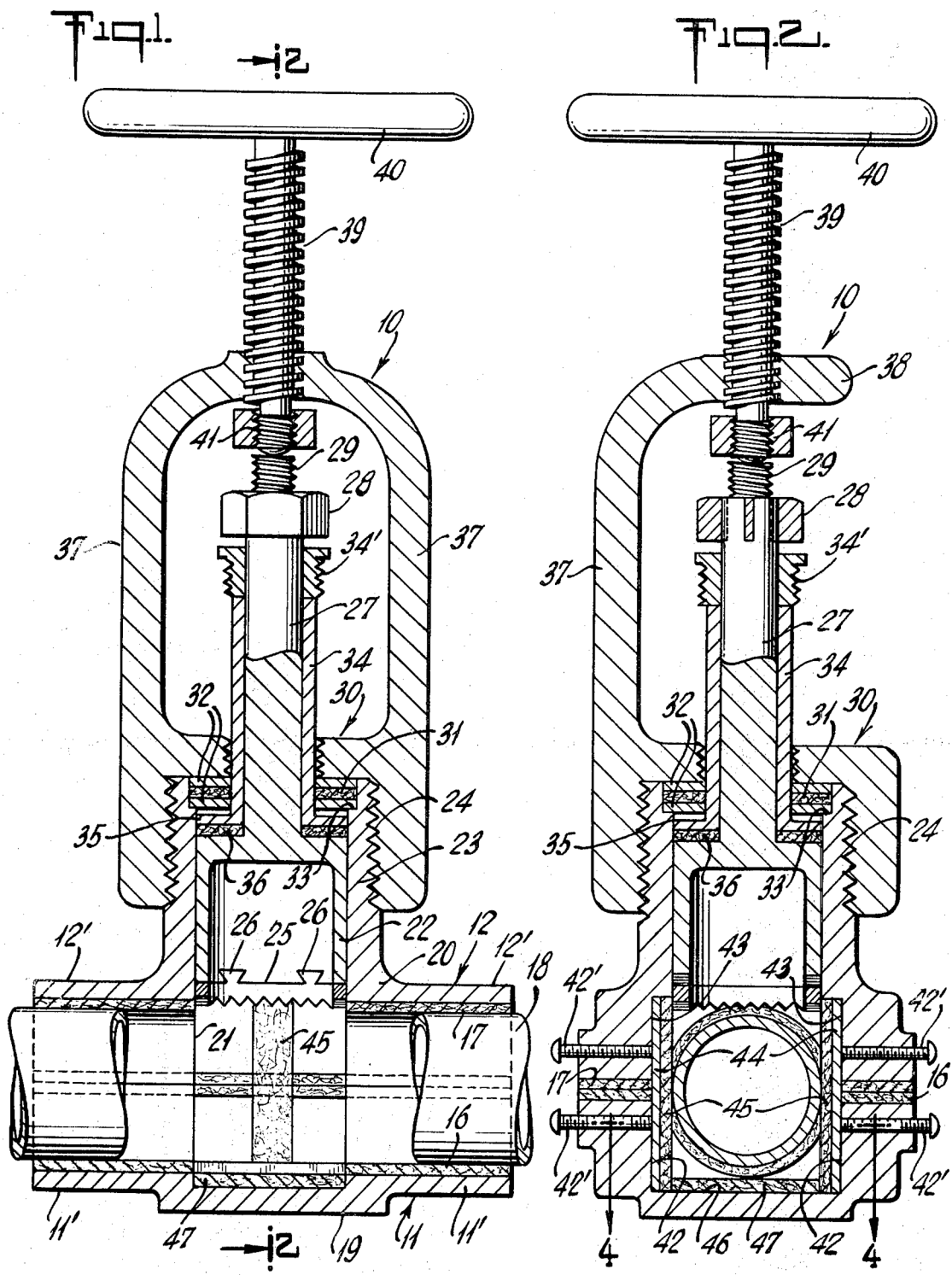
INVENTOR
ROBERT J. McKEAN
BY
ATTORNEY

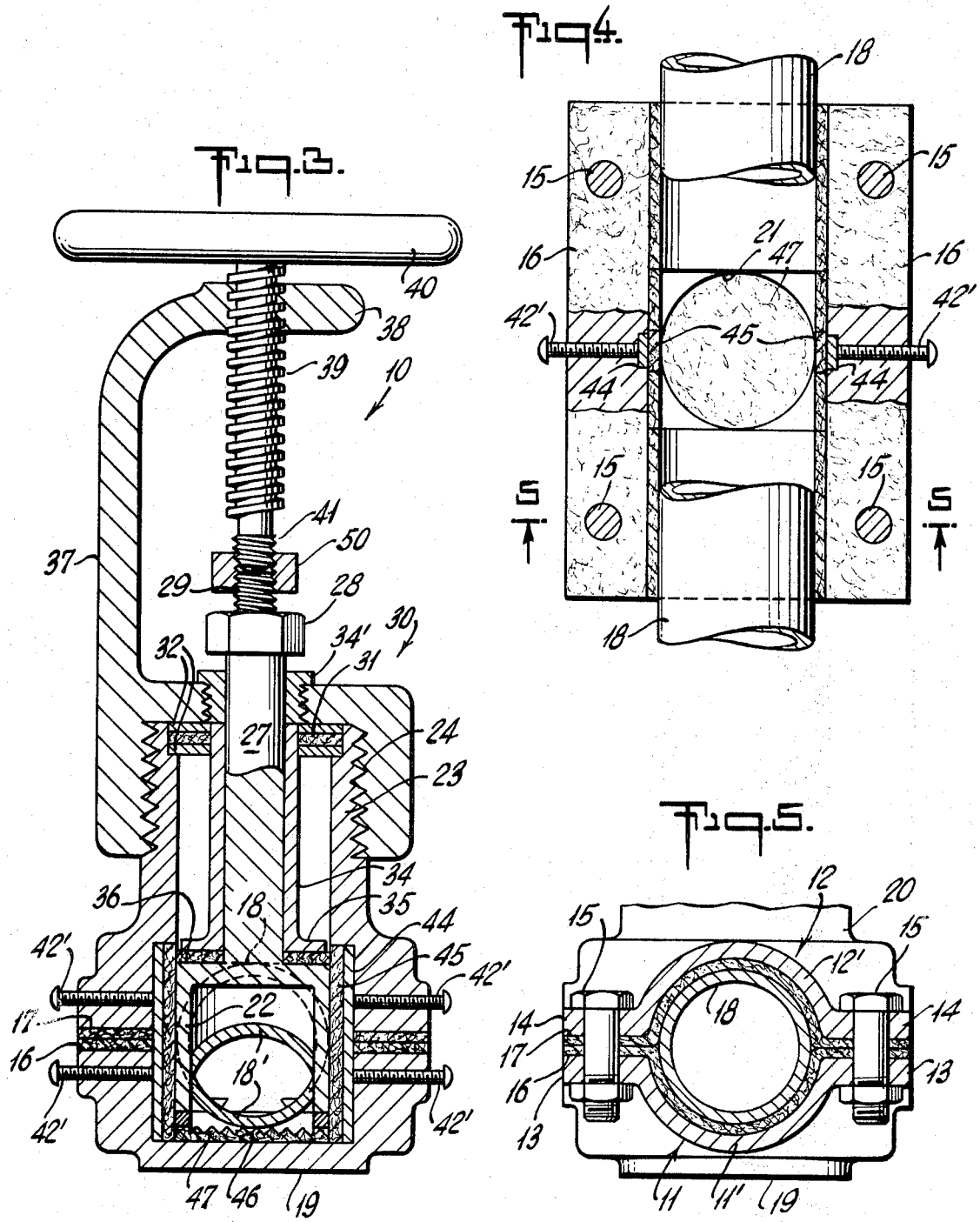

3,532,113

CUTOFF VALVE

This invention relates to cutoff valves and more specifically to a novel and improved valve which can be clamped about a pipe and operated to cut through the pipe to interrupt the flow of fluid. The invention further includes means whereby the valve may thereafter be operated as a normal valve to control the fluid flow.

Cutoff valves for interrupting the flow of fluids in pipe lines where it is either impractical or undesirable to interrupt the source in the event the pipe is damaged or the fluid flow must for other reasons be terminated has presented a serious problem. Prior known structures have not been found entirely satisfactory since they either involved relatively complicated structures, did not afford a positive cutoff or were relatively expensive or difficult to operate. The instant invention overcomes the disadvantages of prior known structures and provides a novel and improved cutoff valve particularly useful in the event of emergencies that can be quickly and easily installed on a pipe and operated to interrupt fluid flow without interrupting the source of the fluid.

Another object of the invention resides in the provision of a novel and improved cutoff valve that may be maintained permanently in position on the pipe and at the same time afford a positive seal to prevent leakage.

A still further object of the invention resides in a novel and improved cutoff valve applicable for use on all sizes of pipe and which can be operated to quickly interrupt the flow of fluid and thereafter be utilized in the nature of a gate valve and form a permanent part of the piping system.

A still further object of the invention resides in the provision of a novel and improved fluid cutoff valve.

The above and other objects and advantages of the invention will become more apparent from the following description and accompanying drawings forming part of this application.

In the drawings:

FIG. 1 is a vertical cross-sectional view of a valve in accordance with the invention;

FIG. 2 is a cross-sectional view of FIG. 1 taken along the line 2–2 thereof;

FIG. 3 is a cross-sectional view similar to FIG. 2 with the valve in the closed position;

FIG. 4 is a cross-sectional view of FIG. 2 taken along the line 4–4 thereof; and FIG. 5 is a cross-sectional view of FIG. 4 taken along the line 5–5 thereof.

The cutoff valve in accordance with the invention is generally denoted by the numeral 10 and comprises a pair of housing sections 11 and 12. The outer end portions 11' and 12' of the housing sections are essentially semicircular and are provided with outwardly extending flanges 13 and 14, respectively, having openings therethrough for the receipt of fastening bolts 15. The housing portions 11' and 12' as well as the flanges 13 and 14 are also preferably provided with suitable gaskets 16 and 17 so that when the housing sections are clamped about a pipe 18, a permanent fluid seal will be provided. The central portions 19 and 20 of the housing sections 11 and 12 are enlarged as viewed in FIGS. 2 and 3 and are provided with a central annular bore 21 to slidably receive a cylindrical member 22 which, as will be shown, functions to sever the pipe and operate as a gate to interrupt the flow of fluid. The central portion 20 of the housing section 12 further includes an upwardly extending tubular member 23 having a threaded section 24, an internal diameter equal to the internal diameter of the bore 21 and of a depth sufficient to receive the cylindrical cutter and gate 22 as shown more clearly in FIG. 1.

The gating and cutting member 22 is essentially in the form of an inverted cup and in the instant embodiment of the invention carries a toothed ring 25 removably secured thereto by dovetailed joints 26. The cutting teeth are formed in the ring 25 in a manner that will cause the removed metal particles to feed into the center of the member 22. The upper portion of the gating and cutting member 22 has an upwardly extending shaft 27 and a nut 28 fixedly secured at a point adjoining the upper end thereof. The portion of shaft 27 extending beyond the nut 27 is provided with lefthand screw threads 29.

The tubular member 23 is provided with a cap 30 threadably secured thereto. The cap 30 is sealed to the tubular member 23 by a gasket 31 and a pair of washers 32 which fit into a recess 33 in the tubular member 23. A sleeve 34 surrounds the shaft 27 and slidably engages the opening in washers 32. The sleeve includes a flanged bottom portion 35 which rests on a gasket 36 overlying the top of the cutter gate 22. The cap 30 further includes an upwardly extending bracket or semicylindrical housing 37 terminating in a generally horizontal upper section 38. The section 38 threadably receives a threaded stem 39 carrying a handle 40 on the upper end thereof. The lower section of the stem 39 has a lefthand threaded section 41 which, as will be pointed out, functions in combination with the threaded section 29 to secure the stem 39 to the shaft 27. The central opening in the cap 30 through which the shaft 27 and sleeve 34 extend is threaded to receive a threaded collar 34'. This collar functions to compress the gasket 36 when the valve is in the closed position in order to insure a complete seal.

Referring again to the housing sections 11 and 12, these sections are provided with vertically disposed recesses 42 and 43 as will be observed more clearly in FIGS. 2 and 3. These recesses each include a metal strip 44 and an overlying gasket 45 which can be urged into pressure engagement with the sides of the cutter gate 22 when the latter is in the lowermost position. This is accomplished in the instant embodiment of the invention by screws 42' which threadably engage openings extending through the housing portions 11 and 12. The bottom housing section 11 includes a central recess 46 carrying a gasket 47 into the teeth on the ring 25 may be embedded when the valve is in the closed position.

In operation of the valve, the housing sections 11 and 12 are clamped about the pipe 18 with the cutter gate 22 and the stem 39 in the upper positions as shown in FIGS. 1 and 2. As soon as the valve is clamped about the pipe, the handle 40 is rotated to cause the stem 39 to apply downward pressure to the shaft 27. At the same time the nut 28 is rotated in order to rotate the cutter gate 22 and cause the teeth on the ring 25 to cut through the pipe 18. The sections of the pipe removed by the cutter 25 will move into the recess within the cutter gate as the latter moves downwardly. As the pipe is completely severed, additional pressure is applied by the handle 40 to urge the teeth on the ring 25 into the gasket 47. The collar 34' is then threadably engaged with the central opening in the cap 30 to urge the sleeve 34 firmly against the top of the cutter gate 22 and compress the gasket 36 to form a tight seal. The screws 42' are then tightened to urge the gaskets 35 against the sides of the cutter gate 22. This arrangement completely seals the incoming pipe section and terminates the flow of fluid therethrough. The position of the elements when the valve is closed is shown in FIG. 3.

When it is desired to open the valve to reestablish fluid flow, a nut 50 provided with lefthand threads is threadably engaged with the threaded portions 41 and 29 of the stem 39 and shaft 27 respectively. By tightening the nut 50, the stem 39 will be fixedly connected to the shaft 27. The valve can now be opened by loosening the threaded collar 34' and at the same time operating the handwheel 40 to raise the stem 39. The screws 42' may also be loosened to permit the cutter gate 22 to slide upwardly into the tubular member 23 until it attains the position substantially as shown in FIG. 1. Thereafter, the device may be operated as a conventional gate valve and can remain in place on the pipe 18.

While only one embodiment of the invention has been illustrated and described, it is apparent that alterations, modifications and changes may be made without departing from the true scope and spirit thereof as defined by the appended claims.

I Claim:

1. A cutoff and control valve for pipes comprising a housing formed of at least two sections clamped one to the other and having a bore extending therethrough, said housing portions being adapted to be sealably clamped about a pipe, one of said housing sections having a tubular member extending therefrom with the internal diameter of said tubular member being greater in diameter than the inside diameter of said pipe, a cylindrical hollow gate slidably and reciprocably retained within said tubular member and having annular cutting means on the lower edge thereof, a cap threadably engaging said tubular member and having a central opening therein, a shaft secured to said cylindrical gate and extending through the opening in said cap, means carried by said shaft for rotating the latter, means for exerting axial pressure on said shaft as the cylindrical gate is rotated and for withdrawing said cylindrical gate, sealing means within said housing and beneath the cutter to sealably engage the cutting means and sealing means in said housing engaging opposing edges of said cylindrical gate when in the lowered position whereby said cutter means severing said pipe to interrupt the flow of fluid therethrough while said housing retains the severed pipe sections in alignment one with the other and said cylindrical gate thereafter functioning as a gate control valve.

2. A cutoff valve according to claim 1 wherein said cap includes an upwardly extending member having a threaded opening in axial alignment with said shaft and said pressure exerting means includes a stem threadably engaging said threaded opening an having an operating handle on the outer end thereof.

3. A cutoff valve according to claim 2 including means for releasably engaging said stem and said shaft for withdrawing said cylindrical gate.

4. A cutoff valve according to claim 2 wherein said housing sections include annular gaskets to seal said housing to said pipe, said other housing section including a recess therein aligned with said cylindrical gate and a gasket therein for sealably receiving the annular cutting means.

5. A cutoff valve according to claim 4 including a sleeve surrounding said shaft and having a flange on the lower end thereof, a gasket between said flange and said cylindrical gate, gasket means between said cap and tubular member and sealably engaging said sleeve, said opening in said cap being threaded and an annular threaded collar threadably engaging the last said opening to press said sleeve downwardly when the cylindrical gate is in the lowermost position.

6. A cutoff valve according to claim 5 wherein said housing portions include recesses axially aligned with said cylindrical gate, gasket means in said recesses and means including screws extending through said housing sections for urging the last said gasket means against the cylindrical gate when the latter is in the lowermost position.